US012685313B2

(12) United States Patent
Caballero et al.

(10) Patent No.: US 12,685,313 B2
(45) Date of Patent: Jul. 21, 2026

(54) AGRICULTURAL COMPOSITION COMPRISING KASUGAMYCIN

(71) Applicants: UPL Corporation Limited, Port Louis (MU); UPL Europe LTD, Warrington (GB)

(72) Inventors: Marín Virgilio Valdés Caballero, Saltillo (MX); Susana Solis Gaona, Saltillo (MX); Paola Catalina Leija Martínez, Saltillo (MX); Mario Ramón Villareal Cárdenas, Saltillo (MX); María de Lourdes Delgado Hernandez, Saltillo (MX); Mauricio Alberto Vargas Martínez, Saltillo (MX)

(73) Assignees: UPL CORPORATION LIMITED, Port Louis (MU); UPL EUROPE LTD, Warrington (GB)

( * ) Notice: Subject to any disclaimer, the term of this patent is extended or adjusted under 35 U.S.C. 154(b) by 387 days.

(21) Appl. No.: 18/548,110

(22) PCT Filed: Feb. 28, 2022

(86) PCT No.: PCT/GB2022/050529
§ 371 (c)(1),
(2) Date: Aug. 28, 2023

(87) PCT Pub. No.: WO2022/185036
PCT Pub. Date: Sep. 9, 2022

(65) Prior Publication Data
US 2024/0138410 A1 May 2, 2024

(30) Foreign Application Priority Data

Mar. 1, 2021  (IN) ............................. 202121008446

(51) Int. Cl.
*A01N 43/32* (2006.01)
*A01N 25/02* (2006.01)
*A01P 1/00* (2006.01)
*A01P 3/00* (2006.01)

(52) U.S. Cl.
CPC ............. *A01N 43/32* (2013.01); *A01N 25/02* (2013.01); *A01P 1/00* (2021.08); *A01P 3/00* (2021.08)

(58) Field of Classification Search
None
See application file for complete search history.

(56) References Cited

U.S. PATENT DOCUMENTS

2007/0191227 A1    8/2007  Pfeiffer et al.
2024/0049720 A1    2/2024  Valdés Caballero et al.
2024/0130366 A1    4/2024  Caballero et al.

FOREIGN PATENT DOCUMENTS

| CN | 1823591 A | 8/2006 |
| CN | 102885086 A | 1/2013 |
| CN | 102057914 B | 7/2013 |
| CN | 103430943 A | 12/2013 |
| CN | 103828814 A | 6/2014 |
| CN | 104222090 A | 12/2014 |
| CN | 104255743 A | 1/2015 |
| CN | 104542601 A | 4/2015 |
| CN | 105104382 A | 12/2015 |
| CN | 105145629 A | 12/2015 |
| CN | 106614599 A | 5/2017 |
| CN | 106973907 A | 7/2017 |
| CN | 107410315 A | 12/2017 |
| CN | 107439551 A | 12/2017 |
| CN | 107873708 A | 4/2018 |
| CN | 110313486 A | 10/2019 |
| CN | 111226936 A | 6/2020 |

OTHER PUBLICATIONS

Vallad, Gary E., et al. "Comparison of kasugamycin to traditional bactericides for the management of bacterial spot on tomato." HortScience 45.12 (2010): 1834-1840.*
Bonn, W.; "Efficacy of Bactericides for the Control of Fire Blight of Pear"; Acta Horticulturae, vol. 151; 1984; pp. 205-208; DOI:10.17660/ActaHortic.1984.151.26.
Anonymous; "Kasugamycin" [Technical Report]; available online at https://www.ams.usda.gov/sites/default/files/media/Kasugamycin_TR.pdf (retrieved on Apr. 28, 2022); 2021; 32 pages.
Dhakal, D. et al.; "Etiology and Control of Citrus Canker Disease in Kavre"; Nepal Journal of Science and Technology, vol. 10; 2009; pp. 57-61; DOI:10.3126/njst.v1010.2824.
International Search Report and Written Opinion for International Application PCT/GB2022/050410; International Filing Date: Feb. 16, 2022; Date of Mailing: May 12, 2022; 14 pages.
International Search Report and Written Opinion for International Application PCT/GB2022/050529; International Filing Date: Feb. 28, 2022; Date of Mailing: May 24, 2022; 12 pages.
Jamiolkowska, A.; "Natural Compounds as Elicitors of Plant Resistance Against Diseases and New Biocontrol Strategies"; Agronomy, vol. 10, Issue No. 2; 2020; p. 173; DOI:10.3390/agronomy10020173.
Sales Junior, R. et al.; "Efeito de Kasugamicina e Oxicloreto de Cobre no Controle da Mancha-Aquosa do Moleiro"; Fitopatologia Brasiliana, 30(3) 2005; pp. 295-298; DOI:10.1590/S0100-41582005000300014 (w/English Abstract).

(Continued)

*Primary Examiner* — Patrick T Lewis

(74) *Attorney, Agent, or Firm* — CANTOR COLBURN LLP

(57) ABSTRACT

The present disclosure relates to agricultural compositions. Particularly, the present disclosure provides an agricultural composition including Kasugamycin or salt thereof and a plant resistance elicitor (laminarin) that exhibits antifungal and antibacterial properties. Further aspects of the present disclosure relate to an aqueous pre-mix agricultural formulation and a method of preparation thereof.

13 Claims, 4 Drawing Sheets

(56)          References Cited

OTHER PUBLICATIONS

Singh, K.; "Control of Early Blight of Potato Caused by Alternarea
Solani Copper (II) Fungicides"; Annals of Natural Sciences, vol. 3,
Issue No. 1; 2017; pp. 15-17.

* cited by examiner

AGRICULTURAL COMPOSITION COMPRISING KASUGAMYCIN

CROSS REFERENCE TO RELATED APPLICATIONS

This application is a National Stage application of PCT/GB2022/050529, filed Feb. 28, 2022, which claims priority to Indian Patent Application number 202121008446, filed Mar. 1, 2021, both of which are incorporated by reference in their entirety herein.

TECHNICAL FIELD

The present disclosure relates to agricultural combinations and compositions. Particularly, the present disclosure relates to an agricultural composition including kasugamycin or a salt thereof and a plant resistance elicitor (laminarin) exhibiting anti-microbial properties. Further aspects of the present disclosure relate to a liquid agricultural formulation and a method of preparation thereof.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

Kasugamycin is an agricultural antibiotic bactericide that inhibits the proliferation of bacteria by tampering with their ability to make new proteins with ribosome being the major target. It exhibits both antibacterial and fungicidal properties and has been widely used. The mechanism of action of kasugamycin is to disturb the esterase system of pathogen metabolism of amino acid; destroy the biosynthesis of protein; the growth that suppresses mycelia also causes cell granulations, makes pathogen lose breeding and infection ability.

Kasugamycin is quite valued both at a domestic and at the industrial level. Unfortunately, no single bactericide and fungicide is useful in all situations and repeated usage of a single bactericide or fungicide such as kasugamycin frequently leads to the development of resistance in phytopathogens towards kasugamycin and its related bactericide and fungicide compounds. Accordingly, significant efforts have been put forward towards finding new and improved combinations of bactericide, fungicide and other related material of natural or synthetic origin that are safer, have better performance, require lower dosages, easier to use and are cost effective. Combinations have also been studied that produce synergism, i.e., the activity of two, or more, agents exceed the activities of the agents when used alone. However, none of the current approaches or reports seem to satisfy the existing needs.

Moreover, the application of bactericides and fungicides in crop management has been reported to cause persistent issues relating to phytotoxicity as well as emergence of resistance in phytopathogens, resulting in poor disease control and massive crop loss.

There is therefore an unmet need in the art to develop an agricultural combination or composition including a component having a biological origin such as kasugamycin or a salt and a plant resistance elicitor thereof that may overcome the drawbacks associated with the existing agricultural combinations or compositions and exhibits good synergy/functional reciprocity and provides broad-spectrum anti-microbial properties such as antifungal and antibacterial properties at a reduced dosage.

The present invention satisfies the existing urgent needs of providing a synergistic agricultural combination or composition having minimal or no phytotoxicity and mitigating resistance in phytopathogens, as well as others, and generally overcomes the deficiencies found in the prior art.

All publications herein are incorporated by reference to the same extent as if each individual publication or patent application were specifically and individually indicated to be incorporated by reference.

SUMMARY

The present disclosure provides agricultural combinations. Accordingly, the present disclosure provides a combination including kasugamycin or a salt thereof and a plant resistance elicitor that exhibits antimicrobial properties including antifungal and antibacterial properties.

The present disclosure provides a combination of kasugamycin or a salt thereof and a plant resistance elicitor, such that the said elicitor potentiates the anti-phytopathogenic efficacy of kasugamycin by inducing resistance to diseases in plants.

In an aspect, the present disclosure provides a combination including kasugamycin or a salt thereof and laminarin exhibiting anti-microbial properties.

The present disclosure relates to agricultural compositions. Particularly, the present disclosure provides an agricultural composition including kasugamycin or a salt thereof and a plant resistance elicitor that exhibits antifungal and antibacterial properties.

In an aspect, the plant resistance elicitor is one or more of chemical elicitors selected from laminarin, salicylic acid, methyl salicylate, benzothiadiazole, benzoic acid and chitosan.

Further, aspects of the present disclosure relate to an aqueous pre-mix agricultural formulation and a method of preparation thereof.

The present disclosure is on the premise of a surprising finding by the inventors of the instant application that combinations or compositions including kasugamycin or a salt thereof and a plant resistance elicitor (laminarin, in particular) exhibits good synergy or functional reciprocity therebetween, aids in reducing dosage of kasugamycin or a salt thereof, and consequently aids in reducing or mitigating phytotoxicity. It could also be noted that the compositions may aid in precluding development of resistance of phytopathogens towards kasugamycin or its salt.

Accordingly, an aspect of the present disclosure provides an agricultural composition comprising an agriculturally effective amount of kasugamycin or a salt thereof; an agriculturally effective amount of a plant resistance elicitor; and an agriculturally acceptable excipient.

In an aspect, the plant resistance elicitor comprises laminarin.

In an aspect, the composition comprises kasugamycin or a salt thereof in an amount ranging from 0.1% to 40% w/v by weight of the composition.

The composition comprises kasugamycin or a salt thereof and the plant resistance elicitor in a weight ratio ranging from 1:1 to 1:30.

The composition comprises kasugamycin or a salt thereof and the plant resistance elicitor in a weight ratio ranging from 1:1 to 1:20.

The composition comprises kasugamycin or a salt thereof and the plant resistance elicitor in a weight ratio ranging from 1:1 to 1:10.

In an aspect, the composition comprises kasugamycin or a salt thereof and the plant resistance elicitor in a weight ratio ranging from 1:10 to 10:1.

In another aspect, the composition comprises kasugamycin or a salt thereof and a plant resistance elicitor in a weight ratio ranging from 1:5 to 5:1.

In yet another aspect, the composition comprises kasugamycin or a salt thereof and the plant resistance elicitor in a weight ratio ranging from 1:2 to 2:1. In an embodiment, the composition comprises kasugamycin or a salt thereof and the plant resistance elicitor in a weight ratio ranging from 1:1 to 1:7.

In an aspect, the composition comprises kasugamycin or salt thereof in an amount ranging from 0.1% to 40% w/v, laminarin in an amount ranging from 0.1% to 50% w/v, and an excipient in an amount ranging from 10% to 99% w/v, each ingredient by weight of the composition.

In another aspect, the composition exhibits wide spectrum antimicrobial properties, i.e. antifungal and antibacterial properties. Particularly, the composition of the present disclosure is effective against *Pectobacterium carotovorum, Burkholderia gladioli, Botrytis cinerea, Peronospora* spp., *Alternaria* sp., *Alternaria alternata, Alternaria porri, Erysiphe* spp., *Stemphylium vesicarium, Fusarium* spp., *Pythium* spp., *Rhizoctonia* spp., *Erwinia carotovora,* and *Pyricularia oryzae.*

In an aspect, the composition is formulated as a liquid.

In an aspect, the salt of kasugamycin is kasugamycin hydrochloride hydrate.

In an embodiment, the plant resistance elicitor is laminarin.

In an embodiment, the formulation comprises kasugamycin or a salt thereof and the plant resistance elicitor in a weight ratio ranging from 1:5 to 5:1. In an embodiment, the formulation comprises kasugamycin or a salt thereof and the plant resistance elicitor in a weight ratio ranging from 1:2 to 2:1. In an embodiment, the formulation comprises kasugamycin or a salt thereof and the plant resistance elicitor in a weight ratio ranging from 1:1 to 1:7.

Another aspect of the present disclosure provides an aqueous pre-mix agricultural formulation, said formulation comprising: kasugamycin or salt thereof in an amount ranging from 0.1% to 40% by weight of the composition; a plant resistance elicitor; and an agriculturally acceptable excipient, wherein the weight ratio of kasugamycin or a salt thereof and the plant resistance elicitor is in the range of 1:10 to 10:1.

In an embodiment, the composition is formulated as an aqueous pre-mix formulation. In an embodiment, the agriculturally acceptable excipient is any or a combination of a surfactant, a preservative, a coloring agent, a pH adjusting agent, anti-foaming agent and a solvent. In an embodiment, the surfactant includes alkyl phenyl ether and ethylene glycol.

In an embodiment, the preservative includes potassium sorbate.

In an embodiment, the solvent includes water.

In an embodiment, the formulation has a pH ranging from 1.5 to 5.5.

In an embodiment, the liquid formulation comprises, kasugamycin or salt thereof in an amount ranging from 0.1% to 40% w/v, laminarin in an amount ranging from 0.1%-50% w/v, and an excipient in an amount ranging from 10% to 99% w/v, each component by weight of the formulation.

Various objects, features, aspects and advantages of the inventive subject matter will become more apparent from the following detailed description of preferred embodiments.

DETAILED DESCRIPTION OF THE DRAWINGS

FIG. 1 provides a graph showing comparative activities of kasugamycin alone, laminarin alone and the combination of kasugamycin and laminarin (referred to as "K+L" in the graph).

DETAILED DESCRIPTION OF THE INVENTION

Figure 1:
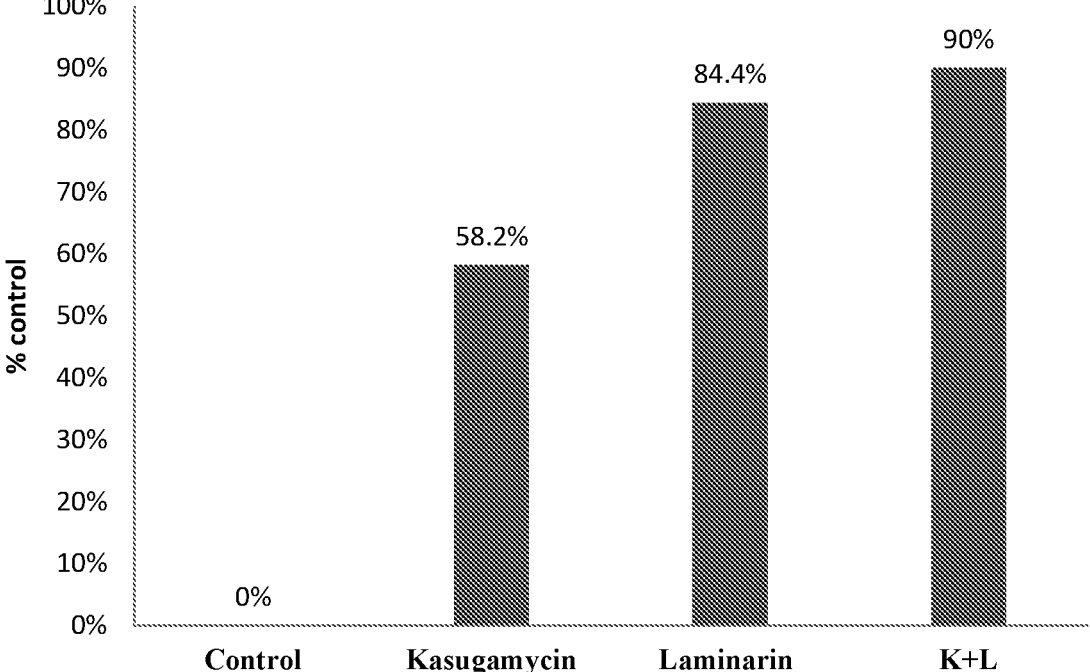

The following is a detailed description of embodiments of the present invention. The embodiments are in such detail as to clearly communicate the invention. However, the amount of detail offered is not intended to limit the anticipated variations of embodiments; on the contrary, the intention is to cover all modifications, equivalents, and alternatives falling within the spirit and scope of the present invention as defined by the appended claims.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases, it will be recognized that references to the "invention" will refer to subject matter recited in one or more, but not necessarily all, of the claims.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability.

Unless the context requires otherwise, throughout the specification which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

"Alkyl" as used herein means a straight or branched chain saturated aliphatic hydrocarbon having the specified number of carbon atoms. Alkyl groups include, for example, groups having from 1 to 50 carbon atoms ($C_1$ to $C_{50}$ alkyl).

"Alkylene" means a straight, branched or cyclic divalent aliphatic hydrocarbon group, and may have from 1 to about 18 carbon atoms, more specifically 2 to about 12 carbons. Exemplary alkylene groups include methylene (—CH$_2$—), ethylene (—CH$_2$CH$_2$—), propylene (—(CH$_2$)$_3$), cyclohexylene (—C$_6$H$_{10}$—), methylenedioxy (—O—CH$_2$—O—), or ethylenedioxy (—O—(CH$_2$)$_2$—O—).

"Aryloxy" means an aryl moiety that is linked via an oxygen (i.e., —O-aryl). An aryloxy group includes a $C_6$ to $C_{30}$ aryloxy group, and specifically a $C_6$ to $C_{18}$ aryloxy group. Non-limiting examples include phenoxy, naphthyloxy, and tetrahydronaphthyloxy.

In some embodiments, the numbers expressing quantities of ingredients, properties such as concentration, and so forth, used to describe and claim certain embodiments of the invention are to be understood as being modified in some instances by the term "about."Accordingly, in some embodiments, the numerical parameters set forth in the written description are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable.

The recitation of ranges of values herein is merely intended to serve as a shorthand method of referring individually to each separate value falling within the range. Unless otherwise indicated herein, each individual value is incorporated into the specification as if it were individually recited herein.

The headings and abstract of the invention provided herein are for convenience only and do not interpret the scope or meaning of the embodiments.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

Various terms as used herein are shown below. To the extent a term used in a claim is not defined below, it should be given the broadest definition persons in the pertinent art have given that term as reflected in printed publications and issued patents at the time of filing.

The present disclosure relates to agricultural compositions. Particularly, the present disclosure provides an agricultural composition including Kasugamycin or salt thereof and a plant resistance elicitor that exhibits antifungal and antibacterial properties. Further, aspects of the present disclosure relate to an aqueous pre-mix agricultural formulation and a method of preparation thereof.

The present disclosure is based on the premise of an unexpected finding by the inventors of the instant application that compositions including Kasugamycin or a salt thereof and a plant resistance elicitor, laminarin, exhibits good synergy/functional reciprocity therebetween, aids in reducing dosage of kasugamycin or salt thereof, and consequently aids in reducing or mitigating phytotoxicity. It could also be noted that the compositions may aid in precluding development of resistance of phytopathogens towards kasugamycin or salt thereof. This effect is plausibly owing to the reason that—laminarin, having structure similar to the degradation products of fungal cell wall (oligo-glycans), acts as an elicitor for the activation of plant defence mechanisms, through the reinforcement of cell walls, production of phytoalexins and pathogenesis-related (PR) proteins.

The present disclosure provides agricultural combinations. Accordingly, the present disclosure provides a combination including kasugamycin or a salt thereof and a plant resistance elicitor exhibiting antimicrobial properties including antifungal and antibacterial properties.

The present disclosure provides a combination of kasugamycin or a salt thereof and a plant resistance elicitor, such that the said elicitor potentiates the anti-phytopathogenic efficacy of kasugamycin by inducing resistance to diseases in plants.

In an embodiment, kasugamycin salt is kasugamycin hydrochloride hydrate.

In a preferred embodiment, the plant resistance elicitor is laminarin.

In a preferred embodiment, the present disclosure provides a combination including kasugamycin or a salt thereof and laminarin exhibiting anti-microbial properties.

In an embodiment, the combination comprises kasugamycin or a salt thereof and the plant resistance elicitor in a weight ratio ranging from 1:1 to 1:30.

In an embodiment, the combination comprises kasugamycin or a salt thereof and the plant resistance elicitor in a weight ratio ranging from 1:1 to 1:20.

In a preferred embodiment, the combination comprises kasugamycin or a salt thereof and the plant resistance elicitor in a weight ratio ranging from 1:1 to 1:10.

In a preferred embodiment, the combination comprises kasugamycin or a salt thereof and the plant resistance elicitor in a weight ratio ranging from 1:1 to 1:10.

In an embodiment, the combination comprises kasugamycin or salt thereof and laminarin in a weight ratio ranging from 1:10 to 10:1.

In an embodiment, the combination comprises kasugamycin or salt thereof and laminarin in a weight ratio ranging from 1:5 to 5:1.

In an embodiment, the combination comprises kasugamycin or salt thereof and laminarin in a weight ratio ranging from 1:2 to 2:1.

In an embodiment, the combination comprises kasugamycin or salt thereof and laminarin in a weight ratio ranging from 1:1 to 1:7.

Accordingly, an aspect of the present disclosure provides an agricultural composition, said composition comprising:

an agriculturally effective amount of kasugamycin or salt thereof; an agriculturally effective amount of a plant resistance elicitor; and an agriculturally acceptable excipient.

In an embodiment, the salt of kasugamycin is kasugamycin hydrochloride hydrate.

In an embodiment, the plant resistance elicitor is one or more of chemical elicitors selected from laminarin, salicylic acid, methyl salicylate, benzothiadiazole, benzoic acid and chitosan.

In an embodiment, the plant resistance elicitor is laminarin or extracts comprising the same.

In an embodiment, the plant resistance elicitor is laminarin.

In an embodiment, the composition comprises kasugamycin or a salt thereof in an amount ranging from 0.1% to 40% by weight of the composition.

In an embodiment, the composition comprises kasugamycin or a salt thereof and the plant resistance elicitor in a weight ratio ranging from 1:1 to 1:30.

In an embodiment, the composition comprises kasugamycin or a salt thereof and the plant resistance elicitor in a weight ratio ranging from 1:1 to 1:20.

In an embodiment, the composition comprises kasugamycin or a salt thereof and the plant resistance elicitor in a weight ratio ranging from 1:1 to 1:10.

In an embodiment, the composition comprises kasugamycin or salt thereof and the plant resistance elicitor in a weight ratio ranging from 1:10 to 10:1.

In an embodiment, the composition comprises kasugamycin or salt thereof and the plant resistance elicitor in a weight ratio ranging from 1:5 to 5:1.

In an embodiment, the composition comprises kasugamycin or salt thereof and the plant resistance elicitor in a weight ratio ranging from 1:2 to 2:1.

In an embodiment, the composition comprises kasugamycin or salt thereof and the plant resistance elicitor in a weight ratio ranging from 1:1 to 1:7.

In an embodiment, the composition comprises kasugamycin or a salt thereof in an amount ranging from 0.1% to 40% (w/v), laminarin in an amount ranging from 0.1%-50% (w/v), and an excipient in an amount ranging from 10% to 99%(w/v) by weight of the composition.

In an embodiment, the composition comprises kasugamycin or a salt thereof in an amount ranging from 0.1% to 40% (w/v) by weight of the composition.

In an embodiment, the composition comprises kasugamycin or a salt thereof in an amount ranging from 1% to 40% (w/v) by weight of the composition.

In an embodiment, the composition comprises kasugamycin or a salt thereof in an amount ranging from 1% to 35% (w/v) by weight of the composition.

In an embodiment, the composition comprises kasugamycin or a salt thereof in an amount ranging from 2% to 35% (w/v) by weight of the composition.

In an embodiment, the composition comprises kasugamycin or a salt thereof in an amount ranging from 5% to 30% (w/v) by weight of the composition.

In a preferred embodiment, the composition comprises kasugamycin or a salt thereof in an amount ranging from 10% to 30% (w/v) by weight of the composition.

In another preferred embodiment, the composition comprises kasugamycin or a salt thereof in an amount ranging from 15% to 30% (w/v) by weight of the composition.

In an embodiment, the composition comprises laminarin in an amount ranging from 0.1%-50% w/v by weight of the composition.

In an embodiment, the composition comprises laminarin in an amount ranging from 1%-40% (w/v) by weight of the composition.

In an embodiment, the composition comprises laminarin in an amount ranging from 5%-30% w/v by weight of the composition.

In a preferred embodiment, the composition comprises laminarin in an amount ranging from 10%-30% w/v by weight of the composition.

In another preferred embodiment, the composition comprises laminarin in an amount ranging from 15%-30% w/v by weight of the composition.

In an embodiment, the composition exhibits wide spectrum antifungal and antibacterial properties. Particularly, the composition of the present disclosure is effective against *Pectobacterium carotovorum, Burkholderia gladioli, Botrytis cinerea, Peronospora* spp., *Alternaria porri, Erysiphe* spp., *Stemphylium vesicarium, Fusarium* spp., *Pythium* spp., *Rhizoctonia* spp., *Erwinia carotovora*, and *Pyricularia oryzae*.

In an embodiment the present compositions further comprising an herbicide, fungicide, insecticide, nematicide, acaricides or combinations thereof.

In an embodiment the insecticide may be selected from group of Acetylcholinesterase (AChE) inhibitors, GABA-gated chloride channel blockers, Sodium channel modulators, Nicotinic acetylcholine receptor (nAChR) competitive modulators, Nicotinic acetylcholine receptor (nAChR) allosteric modulators—Site I, Glutamate-gated chloride channel (GluCl) allosteric modulators, Juvenile hormone mimics, miscellaneous nonspecific (multi-site) inhibitors, Chordotonal organ TRPV channel modulators, Mite growth inhibitors affecting CHS1, Microbial disruptors of insect midgut membranes, Inhibitors of mitochondrial ATP synthase, Uncouplers of oxidative phosphorylation via disruption of the proton gradient, Nicotinic acetylcholine receptor (nAChR) channel blockers, Inhibitors of chitin biosynthesis affecting CHS1. Inhibitors of chitin biosynthesis, Moulting disruptors, Dipteran, Ecdysone receptor agonists, Octopamine receptor agonists, Mitochondrial complex III electron transport inhibitors, Mitochondrial complex I electron transport inhibitors, Voltage-dependent sodium channel blockers, Inhibitors of acetyl CoA carboxylase, Mitochondrial complex IV electron transport inhibitors, Mitochondrial complex II electron transport inhibitors, Ryanodine receptor modulators, Chordotonal organ Modulators—undefined target site, GABA-gated chloride channel allosteric modulators and Baculoviruses.

In an embodiment, the fungicide may be selected from nucleic acid synthesis inhibitors, cytoskeleton and motor protein inhibitors, amino acids and protein synthesis inhibitors, respiration process inhibitors, signal transduction inhibitors, lipid synthesis or transport and membrane integrity disruptors or functions, sterol biosynthesis inhibitors, melanin synthesis inhibitors, cell wall biosynthesis inhibitors, melanin synthesis inhibitor in cell wall, host plant defence inductors, fungicides with unknown modes of action, non-classified fungicides, fungicides with multisite activity and/or biologicals with multiple mode of action.

In an embodiment, the herbicide may be selected from a isoxazolidinone herbicide, a urea herbicide, a triazine herbicide, a hydroxybenzonitrile herbicide, a thiocarbamate herbicide, a pyridazine herbicide, chloroacetanilide herbicides; benzothiazole herbicides; carbanilate herbicides, cyclohexene oxime herbicides; picolinic acid herbicides; pyridine herbicides; quinolinecarboxylic acid herbicides; chlorotriazine herbicides, aryloxyphenoxypropionic herbicides, oxadiazolone herbicides; phenylurea herbicides, sulfonanilide herbicides; triazolopyrimidine herbicides, amide herbicides, pyridazine herbicides, dinitroaniline herbicides or combinations thereof.

In an embodiment, the agriculturally acceptable excipient is any or a combination of a wetting agent, a dispersing agent, a binding agent, an anti-freeze agent, surfactant, a preservative, a coloring agent, a pH adjusting agent, anti-foaming agent and a solvent. However, it should be appreciated that any other agriculturally acceptable excipients, as known to a person skilled in the art, may be used to serve its intended purpose.

In an embodiment, the agriculturally acceptable excipients are present in an amount ranging from 5% to 99% by weight of the composition.

In an embodiment, the agriculturally acceptable excipients are present in an amount ranging from 10% to 60% w/v of the composition.

In an embodiment, the agriculturally acceptable excipients are present in an amount ranging from 15% to 60% w/v of the composition.

The wetting agent may include any or a combination comprising sulfosuccinates, naphthalene sulfonates, sulfated esters, phosphate esters, sulfated alcohol and alkyl benzene sulfonates, but not limited thereto.

The dispersing agent may include any or a combination comprising polycarboxylates, naphthalene sulfonate condensates, phenol sulfonic acid condensates, lignosulfonates, methyl oleyl taurates and polyvinyl alcohols, but not limited thereto.

The binding agent may include any or a combination comprising polyvinyl alcohols, phenyl naphthalene sulphonate, lignin derivatives, polyvinyl pyrrolidone, polyalkylpyrrolidone, carboxymethylcellulose, xanthan gum, polyethoxylated fatty acids, polyethoxylated fatty alcohols, ethylene oxide copolymer, propylene oxide copolymer, polyethylene glycols and polyethylene oxides, but not limited thereto.

The surfactant may include any or a combination comprising ionic surfactants and non-ionic surfactants. Non-limiting examples of ionic surfactants include sulfonic acids, sulfuric acid esters, carboxylic acids, and salts thereof. Non-limiting examples of water soluble anionic surfactants include alkyl sulfates, alkyl ether sulfates, alkyl amido ether sulfates, alkyl aryl polyether sulfates, alkyl aryl sulfates, alkyl aryl sulfonates, monoglyceride sulfates, alkyl sulfonates, alkyl amide sulfonates, alkyl aryl sulfonates, benzene sulfonates, toluene sulfonates, xylene sulfonates, cumene sulfonates, alkyl benzene sulfonates, alkyl diphenyloxide sulfonate, alpha-olefin sulfonates, alkyl naphthalene sulfonates, paraffin sulfonates, lignin sulfonates, alkyl sulfosuccinates, ethoxylated sulfosuccinates, alkyl ether sulfosuccinates, alkylamide sulfosuccinates, alkyl sulfosuccinamate, alkyl sulfoacetates, alkyl phosphates, phosphate ester, alkyl ether phosphates, acyl sarconsinates, acyl isethionates, N-acyl taurates, N-acyl-N-alkyltaurates, and alkyl carboxylates. Non-limiting examples of the non-ionic surfactants include glycerol ethers, glycol ethers, ethanolamides, sulfoanylamides, alcohols, amides, alcohol ethoxylates, glycerol esters, glycol esters, ethoxylates of glycerol ester and glycol esters, sugar-based alkyl polyglycosides, polyoxyethylenated fatty acids, alkanolamine condensates, alkanolamides, tertiary acetylenic glycols, polyoxyethylenated mercaptans, carboxylic acid esters, polyoxyethylenated polyoxyproylene glycols, sorbitan fatty esters, or combinations thereof. Also included are EO/PO block copolymers (EO is ethylene oxide, PO is propylene oxide), EO polymers and copolymers, polyamines, and polyvinylpynolidones, sorbitan fatty acid alcohol ethoxylates and sorbitan fatty acid ester ethoxylates.

In an embodiment, the surfactant includes an alkyl phenyl ether and a polyol.

In an embodiment, the present composition comprises at least one polyol and the polyol is selected from an acyclic polyol and a cyclic polyol.

Examples of such polyol compounds include sugars, sugar alcohols, sugar acids and uronic acids. Preferred polyols are sugars, sugar alcohols and sugar acids, including, but not limited to mannitol, glycerin, xylitol, and sorbitol.

The polyol may comprise ethylene glycol, 1,2-propylene glycol, 1,3-propylene glycol, 1,2-butanediol, 1,3-butanediol, 1,4-butanediol, 1,4-pentanediol, 3-methyl-1,5-pentanediol, 2,3-dimethyl-2,3-butanediol, trimethylol propane, mannitol, sorbitol, glycerol, pentaerythritol, 1,4-cyclohexanedimethanol, xylenol, bisphenols such as bisphenol A, and the like. In addition, ether alcohols such as diethylene glycol, triethylene glycol, tetraethylene glycol, polyoxyethylene or polyoxypropylene glycols of molecular weight up to about 4000, diethylene glycol monomethyl ether, diethylene glycol monoethyl ether, triethylene glycol monomethylether, polyether polyol, butoxyethanol, butylene glycol monobutylether, dipentaerythritol, tripentaerythritol, tetrapentaerythritol, diglycerol, triglycerol, tetraglycerol, pentaglycerol, hexaglycerol, heptaglycerol, and octaglycerol may be employed.

In an embodiment, the surfactant includes an alkyl phenyl ether and ethylene glycol.

In an embodiment, the surfactant including an alkyl phenyl ether and a polyol comprises 1% to 20% w/v of the composition.

In an embodiment, the surfactant including an alkyl phenyl ether and a polyol comprises 5% to 15% w/v of the composition.

The anti-freezing agents may include any or a combination of ethylene glycol, propylene glycol, urea, glycerin and anti-freeze proteins, but not limited thereto.

The minerals may include any or a combination of kaolin, silica, titanium (IV) oxide, rutile, anatase, aluminum oxides, aluminum hydroxides, iron oxide, iron sulfide, magnetite, pyrite, hematite, ferrite, gregite, calcium carbonate, calcite, aragonite, quartz, zircon, olivine, orthopyroxene, tourmaline, kyanite, albite, anorthite, clinopyroxene, orthoclase, gypsum, andalusite, talc, fluorite, apatite, orthoclase, topaz, corundum, diamond, tin, tin oxides, antimony, antimony oxides, beryllium, cobalt, copper, feldspar, gallium, indium, lead, lithium, manganese, mica, molybdenum, nickel, perlite, platinum group metals, phosphorus and phosphate rock, potash, rare earth elements, tantalum, tungsten, vanadium, zeolites, zinc and zinc oxide, and indium tin oxide, but not limited thereto.

The fillers may include any or a combination of diatomaceous earth, kaolin, bentonite, precipitated silica, attapulgite, and perlite, but not limited thereto.

The advantageous agricultural compositions of the present disclosure can be formulated in any of formulations such as aqueous formulation, aerosol, emulsifiable concentrate, wettable powder, soluble concentrate, soluble powder, suspension concentrate, spray concentrate, capsule suspension, water dispersible granule, granules, dusts, microgranule seed treatment formulation and the likes as known to persons skilled in the art.

In an embodiment, the composition is formulated as liquid formulation.

In an embodiment, the composition is formulated as a non-aqueous solution.

In a preferred embodiment, the composition is formulated as an aqueous solution.

In an embodiment, the liquid agricultural composition comprises an agriculturally acceptable excipient including one or a combination of a surfactant, a preservative, a coloring agent, a pH adjusting agent, and a solvent.

In an embodiment, the present disclosure provides a liquid agricultural composition comprising kasugamycin or a salt thereof; a plant resistance elicitor compound and an agriculturally acceptable excipient, said composition having weight ratio of kasugamycin to the plant resistance elicitor compound ranging from 1:1 to 1:30.

In an embodiment, the present disclosure provides a liquid agricultural composition comprising kasugamycin or a salt thereof; laminarin and an agriculturally acceptable excipient, said composition having weight ratio of kasugamycin to laminarin ranging from 1:1 to 1:30.

In an embodiment, the present disclosure provides a liquid agricultural composition comprising kasugamycin or a salt thereof; laminarin and an agriculturally acceptable excipient, said composition having weight ratio of kasugamycin to laminarin ranging from 1:1 to 1:10.

In an embodiment, the present disclosure provides a liquid agricultural composition comprising kasugamycin or a salt thereof; laminarin and an agriculturally acceptable excipient, said composition having weight ratio of kasugamycin to laminarin ranging from 1:1 to 1:8.

In an embodiment, the present disclosure provides a liquid agricultural composition comprising kasugamycin or a salt thereof; laminarin and an agriculturally acceptable excipient, said composition having weight ratio of kasugamycin to laminarin ranging from 1:1 to 1:5.

In an embodiment, the composition is formulated as an aqueous pre-mix formulation. In an embodiment, the surfactant includes alkyl phenyl ether and ethylene glycol. In an embodiment, the preservative includes potassium sorbate. In an embodiment, the solvent includes water. In an embodiment, the formulation has a pH ranging from 1.5 to 5.5.

Another aspect of the present disclosure provides an aqueous pre-mix agricultural formulation, said formulation comprising: kasugamycin or salt thereof in an amount ranging from 0.1% to 40% by weight of the composition; a plant resistance elicitor; and an agriculturally acceptable excipient, wherein the weight ratio of kasugamycin or salt thereof and the plant resistance elicitor is in the range of 1:10 to 10:1.

In an embodiment, the plant resistance elicitor is one or more of chemical elicitors selected from laminarin, salicylic acid, methyl salicylate, benzothiadiazole, benzoic acid and chitosan.

In a preferred embodiment, the plant resistance elicitor is laminarin.

In an embodiment, the formulation comprises kasugamycin or salt thereof and the plant resistance elicitor in a weight ratio ranging from 1:5 to 5:1. In an embodiment, the formulation comprises kasugamycin or salt thereof and the plant resistance elicitor in a weight ratio ranging from 1:2 to 2:1. In an embodiment, the formulation comprises kasugamycin or salt thereof and the plant resistance elicitor in a weight ratio ranging from 1:1 to 1:7.

In an embodiment, the formulation comprises, by weight of the formulation, kasugamycin or salt thereof in an amount ranging from 0.1% to 40%, laminarin in an amount ranging from 0.1%-50%, and an excipient in an amount ranging from 10% to 99%.

The agricultural benefit may be accrued by treating a seed, a plant, a plant part, a soil, or a combination thereof, with a composition or formulation of the present disclosure under conditions leading to association between the composition and the seed, plant, plant part, soil, or combinations thereof. Application of a formulation to a target can be accomplished using any delivery method known in the art including, but not limited to dusting, fumigation, granule application, injection, misting, seed treatment, spraying, dipping, or coating.

The combinations of the present disclosure provide an agricultural composition as a pre-mix composition or a kit of parts such that individual actives may be mixed before spraying. Alternatively, the kit of parts may contain the kasugamycin or a salt thereof or laminarin, pre-mixed and an optional third active may be admixed with an adjuvant or an agrochemical or a fertilizer compound such that the two components may be tank mixed before spraying.

In an embodiment, the present disclosure provides a process for the preparation of the agricultural composition or combination comprising kasugamycin or salt thereof and the plant resistance elicitor in a weight ratio ranging from 1:1 to 1:10, wherein the said process comprises mixing kasugamycin or salt thereof and the plant resistance elicitor.

In an embodiment, the present disclosure provides a kit-of-parts comprising an agricultural combination of kasugamycin or a salt thereof, and a plant resistance elicitor compound.

In an embodiment, the present disclosure provides a kit-of-parts comprising an agricultural combination of kasugamycin or a salt thereof, and laminarin.

In an embodiment, the present disclosure provides the use of an agricultural composition for controlling phytopathogenic diseases comprising kasugamycin or a salt thereof, and laminarin; wherein the weight ratio of kasugamycin or the salt thereof and laminarin is from 1:1 to 1:30.

The method of the present disclosure may be used to control a broad spectrum of plant diseases.

Diseases in rice include blast (*Magnaporthe grisea*), *Helminthosporium* leaf spot (*Cochliobolus miyabeanus*), sheath blight (*Rhizoctonia solani*), and bakanae disease (*Gibberella fujikuroi*).

Diseases in wheat include powdery mildew (*Erysiphe graminis*), Fusariuin head blight (*Fusarium graminearum, F. avenacerum, F. culmorum, Microdochium nivale*), rust (*Puccinia striiformis, P. graminis, P. recondita*), pink snow mold (*Micronectriella nivale*), Typhula snow blight (*Typhula* sp.), loose smut (*Ustilago tritici*), bunt (*Tilletia caries*), eyespot (*Pseudocercosporella herpotrichoides*), leaf blotch (*Mycosphaerella graminicola*), glume blotch (*Stagonospora nodorum*), *Septoria*, and yellow spot (*Pyrenophora tritici-repentis*).

Diseases of barley include powdery mildew (*Erysiphe graminis*), *Fusarium* head blight (*Fusarium graminearum, F. avenacerum, F. culmorum, Microdochium nivale*), rust (*Puccinia striiformis, P. graminis, P. hordei*), loose smut (*Ustilago nuda*), scald (*Rhynchosporium secalis*), net blotch (*Pyrenophora teres*), spot blotch (*Cochliobolus sativus*), leaf stripe (*Pyrenophora graminea*), and *Rhizoctonia* damping-off (*Rhizoctonia solani*).

Diseases in corn include smut (*Ustilago maydis*), brown spot (*Cochliobolus heterostrophus*), copper spot (*Gloeocercospora sorghi*), southern rust (*Puccinia polysora*), gray leaf spot (*Cercospora zeae-maydis*), white spot (*Phaeosphaeria mydis* and/or *Pantoea ananatis*), and *Rhizoctonia* damping-off (*Rhizoctonia solani*).

Diseases of citrus include melanose (*Diaporthe citri*), scab (*Elsinoe fawcetti*), penicillium rot (*Penicillium digitatum, P. italicum*), and brown rot (*Phytophthora parasitica, Phytophthora citrophthora*).

Diseases of apple include blossom blight (*Monilinia mali*), canker (*Valsa ceratosperma*), powdery mildew (*Podosphaera leucotricha*), *Alternaria* leaf spot (*Alternaria alternata* apple pathotype), scab (*Venturia inaequalis*), powdery mildew, bitter rot (*Colletotrichum acutatum*), crown rot (*Phytophtora cactorum*), blotch (*Diplocarpon mali*), and ring rot (*Botryosphaeria berengeriana*).

Diseases of pear include scab (*Venturia nashicola, V. pirina*), powdery mildew, black spot (*Alternaria alternata* Japanese pear pathotype), rust (*Gymnosporangium haraeanum*), and phytophthora fruit rot (*Phytophtora cactorum*).

Diseases of peach include brown rot (*Monilinia fructicola*), powdery mildew, scab (*Cladosporium carpophilum*), and *Phomopsis* rot (*Phomopsis* sp.).

Diseases of grape include anthracnose (*Elsinoe ampelina*), ripe rot (*Glomerella cingulata*), powdery mildew (*Uncinula necator*), rust (*Phakopsora ampelopsidis*), black rot (*Guignardia bidwellii*), botrytis, and downy mildew (*Plasmopara viticola*).

Diseases of Japanese persimmon include anthracnose (*Gloeosporium kaki*), and leaf spot (*Cercospora kaki, Mycosphaerella nawae*).

Diseases of gourd include anthracnose (*Colletotrichum lagenarium*), powdery mildew (*Sphaerotheca fuliginea*), gummy stem blight (*Mycosphaerella melonis*), *Fusarium* wilt (*Fusarium oxysporum*), downy mildew (*Pseudoperonospora cubensis*), *Phytophthora* rot (*Phytophthora* sp.), and damping-off (*Pythium* sp.).

Diseases of tomato include early blight (*Alternaria solani*), leaf mold (*Cladosporium fulvum*), and late blight (*Phytophthora infestans*).

Diseases of eggplant include brown spot (*Phomopsis vexans*), and powdery mildew (*Erysiphe cichoracearum*)

Diseases of cruciferous vegetables include *Alternaria* leaf spot (*Alternaria japonica*), white spot (*Cercosporella brassicae*), clubroot (*Plasmodiophora brassicae*), and downy mildew (*Peronospora parasitica*).

Diseases of onion include rust (*Puccinia allii*), and downy mildew (*Peronospora destructor*)

Diseases of soybean include purple seed stain (*Cercospora kikuchii*), sphaceloma scad (*Elsinoe glycines*), pod and stem blight (*Diaporthe phaseolorum* var. *sojae*), *Septoria* brown spot (*Septoria glycines*), frogeye leaf spot (*Cercospora sojina*), rust (*Phakopsora pachyrhizi*), Yellow rust, brown stem rot (*Phytophthora sojae*), and *Rhizoctonia* damping-off (*Rhizoctonia solani*).

Diseases of kidney bean include anthracnose (*Colletotrichum lindemuthianum*).

Diseases of peanut include leaf spot (*Cercospora personata*), brown leaf spot (*Cercospora arachidicola*) and southern blight (*Sclerotium rolfsii*).

Diseases of garden pea include powdery mildew (*Erysiphe pisi*), and root rot (*Fusarium solani* f. sp. *pisi*).

Diseases of potato include early blight (*Alternaria solani*), late blight (*Phytophthora infestans*), pink rot (*Phytophthora erythroseptica*), and powdery scab (*Spongospora subterranean* f. sp. *subterranea*).

Diseases of strawberry include powdery mildew (*Sphaerotheca humuli*), and anthracnose (*Glomerella cingulata*).

Diseases of tea include net blister blight (*Exobasidium reticulatum*), white scab (*Elsinoe leucospila*), gray blight (*Pestalotiopsis* sp.), and anthracnose (*Colletotrichum theaesinensis*).

Diseases of tobacco include brown spot (*Alternaria longipes*), powdery mildew (*Erysiphe cichoracearum*), anthracnose (*Colletotrichum tabacum*), downy mildew (*Peronospora tabacina*), and black shank (*Phytophthora nicotianae*).

Diseases of rapeseed include *Sclerotinia* rot (*Sclerotinia sclerotiorum*), and *Rhizoctonia* damping-off (*Rhizoctonia solani*).

Diseases of cotton include *Rhizoctonia* damping-off (*Rhizoctonia solani*).

Diseases of sugar beet include *Cercospora* leaf spot (*Cercospora beticola*), leaf blight (*Thanatephorus cucumeris*), root rot (*Thanatephorus cucumeris*), and *Aphanomyces* root rot (*Aphanomyces cochlioides*).

Diseases of rose include black spot (*Diplocarpon rosae*), powdery mildew (*Sphaerotheca pannosa*), and downy mildew (*Peronospora sparsa*).

Diseases of chrysanthemum and asteraceous plants include downy mildew (*Bremia lactucae*), leaf blight (*Septoria chrysanthemi-indici*), and white rust (*Puccinia horiana*).

Diseases of various groups include diseases caused by *Pythium* spp. (*Pythium aphanidermatum, Pythium debarianum, Pythium graminicola, Pythium irregulare, Pythium ultimum*), gray mold. (*Botrytis cinerea*), and *Sclerotinia* rot (*Sclerotinia sclerotiorum*).

Disease of Japanese radish include *Alternaria* leaf spot (*Alternaria brassicicola*).

Diseases of turfgrass include dollar spot (*Sclerotinia homeocarpa*), and brown patch and large patch (*Rhizoctonia solani*).

Disease of banana include black sigatoka (*Mycosphaerella fijiensis*), and yellow sigatoka (*Mycosphaerella musicola*).

Disease of sunflower include downy mildew (*Plasmopara halstedii*).

Seed diseases or diseases in the early stages of the growth of various plants may be caused by *Aspergillus* spp., *Penicillium* spp., *Fusarium* spp., *Gibberella* spp., *Tricoderma* spp., *Thielaviopsis* spp., *Rhizopus* spp., *Mucor* spp., *Corticium* spp., *Phoma* spp., *Rhizoctonia* spp. and *Diplodia* spp.

Viral diseases of various plants may be mediated by *Polymyxa* spp. or *Olpidium* spp. and so on.

Most plant pathogenic bacteria belong to the following genera: *Erwinia, Pectobacterium, Pantoea, Agrobacterium, Pseudomonas, Ralstonia, Burkholderia, Acidovorax, Xanthomonas, Clavibacter, Streptomyces, Xylella, Spiroplasma*, and *Phytoplasma*.

Particularly, the composition of the present disclosure is effective against *Pseudomonas syringae, Xanthomonas* spp., *Erwinia amylovora, Erwinia carotovora, Pyricularia oryzae, Xanthomonas axonopodis* pv. *Vesicatoria, Burkholderia andropogonis*, and *Streptomyces scabies*.

Examples of the crops on which the present compositions may be used include, are not limited to, corn, rice, wheat, barley, rye, oat, sorghum, cotton, soybean, peanut, buckwheat, beet, rapeseed, sunflower, sugar cane, tobacco, etc.; vegetables: solanaceous vegetables such as eggplant, tomato, pimento, pepper, potato, etc., cucurbit vegetables such as cucumber, pumpkin, zucchini, water melon, melon, squash, etc., cruciferous vegetables such as radish, white turnip, horseradish, kohlrabi, Chinese cabbage, cabbage, leaf mustard, broccoli, cauliflower, etc., asteraceous vegetables such as burdock, crown daisy, artichoke, lettuce, etc, liliaceous vegetables such as green onion, onion, garlic, and asparagus, ammiaceous vegetables such as carrot, parsley, celery, parsnip, etc., chenopodiaceous vegetables such as spinach, Swiss chard, etc., lamiaceous vegetables such as *Perilla frutescens*, mint, basil, etc, strawberry, sweet potato, *Dioscorea japonica*, colocasia, etc., flowers, foliage plants, turf grasses, fruits: pome fruits such apple, pear, quince, etc, stone fleshy fruits such as peach, plum, nectarine, *Prunus mume*, cherry fruit, apricot, prune, etc., citrus fruits such as orange, lemon, rime, grapefruit, etc., nuts such as chestnuts, walnuts, hazelnuts, almond, pistachio, cashew nuts, macadamia nuts, etc. berries such as blueberry, cranberry, blackberry, raspberry, etc., grape, kaki fruit, olive, plum, banana, coffee, date palm, coconuts, etc., trees other than fruit trees; tea, mulberry, flowering plant, trees such as ash, birch, dogwood, Eucalyptus, *Ginkgo biloba*, lilac, maple, Quercus, poplar, Judas tree, *Liquidambar formosana*, plane tree, zelkova, Japanese arborvitae, fir wood, hemlock, juniper, Pinus, Picea, and Taxus cuspidate, etc.

In an embodiment, the present disclosure provides a method of controlling or inhibiting phytopathogens, comprising applying the compositions described herein to the said plant or plant part or plant propagation material or to the locus thereof.

In an embodiment, the present disclosure provides a method of controlling or inhibiting phytopathogens comprising applying at the locus of the infection by the phytopathogen or a plant or a plant part or a plant propagation material a composition comprising;

(i) kasugamycin or a salt thereof, and (ii) a plant resistance elicitor compound;

wherein the weight ratio of kasugamycin or the salt thereof and the plant resistance elicitor compound is from 1:1 to 1:30.

In an embodiment, the present disclosure provides a method of controlling or inhibiting phytopathogens comprising applying at the locus of the infection by the phytopathogen or a plant or a plant part or a plant propagation material a combination comprising;

(i) kasugamycin or a salt thereof, and (ii) laminarin wherein the weight ratio of kasugamycin or the salt thereof and laminarin is from 1:1 to 1:30.

In an embodiment, the present disclosure provides a method of controlling or inhibiting phytopathogens comprising applying at the locus of the infection by the phytopathogen or a plant or a plant part or a plant propagation material a combination comprising;

(i) kasugamycin or a salt thereof, and (ii) laminarin wherein the weight ratio of kasugamycin or the salt thereof and laminarin is from 1:1 to 1:20.

In an embodiment, the present disclosure provides a method of controlling or inhibiting phytopathogens comprising applying at the locus of the infection by the phytopathogen or a plant or a plant part or a plant propagation material a combination comprising;

(i) kasugamycin or a salt thereof, and (ii) laminarin wherein the weight ratio of kasugamycin or the salt thereof and laminarin is from 1:1 to 1:10.

In an embodiment, the present disclosure provides a method of controlling phytopathogens comprising applying at the locus of the infection by the phytopathogen or to a plant or to a plant part or to a plant propagation material a liquid composition comprising;

(i) kasugamycin or a salt thereof, and (ii) a plant resistance elicitor compound;

wherein the weight ratio of kasugamycin or a salt thereof and the plant resistance elicitor compound is ranging from 1:1 to 1:30, wherein the said method comprises applying the kasugamycin or the salt thereof at a dosage ranging from 2 to 5 g/kg of kasugamycin and laminarin at a dosage ranging from 10 to 20 g/kg.

In a preferred embodiment, the present disclosure provides a method of controlling phytopathogens comprising applying at the locus of the infection by the phytopathogen or to a plant or to a plant part or to a plant propagation material a liquid composition comprising;

(i) kasugamycin or a salt thereof, and (ii) laminarin;

wherein the weight ratio of kasugamycin or a salt thereof and laminarin is 1:1 to 1:10, wherein the said method comprises applying the kasugamycin or the salt thereof at a dosage ranging from 2 to 5 g/kg of kasugamycin and laminarin at a dosage ranging from 10 to 20 g/kg.

The composition of the present invention may be applied simultaneously as a tank mix or a formulation or may be applied sequentially. The application may be made to the soil before emergence of the plants, either pre-planting or post-planting. The application may be made as a foliar spray at different timings during crop development, with either one or two applications early or late post-emergence.

The compositions according to the disclosure can be applied before or after infection of the useful plants or the propagation material thereof by fungi or bacteria or any other microbe.

The combination of kasugamycin with a plant resistance elicitor compound, more specifically laminarin greatly improved disease control, reduced occurrence of resistance in microbes as well as improved yield and demonstrated a synergistic effect.

While the foregoing description discloses various embodiments of the disclosure, other and further embodiments of the invention may be devised without departing from the basic scope of the disclosure. The invention is not limited to the described embodiments, versions or examples, which are included to enable a person having ordinary skill in the art to make and use the invention when combined with information and knowledge available to the person having ordinary skill in the art.

EXAMPLES

Example 1: Pre-Mix Formulation

A pre-mix formulation having composition as shown in Table 1 below was prepared:

TABLE 1

| Aqueous Pre-mix Formulation | |
|---|---|
| Ingredient | Amount (g/L) (w/v) |
| Kasugamycin hydrochloride hydrate | 29.9 (equivalent to Kasugamycin-27.3) |
| Laminarin | 22.5 |
| Surfactant: Alkylphenylether + Ethylene glycol | 102.8 |
| Potassium sorbate | 1.65 |
| Acid Blue No. 9 (coloring agent) | 0.1 |

TABLE 1-continued

| Aqueous Pre-mix Formulation | |
| --- | --- |
| Ingredient | Amount (g/L) (w/v) |
| Stabilizer | 37.5 |
| Buffering agent to adjust pH to 3.5 | 2.75 |
| Water | qs |

1000 litres of aqueous pre-mix formulation was prepared with the composition shown in Table 1 above. For preparation of the formulation, about 500 litres of water was taken in a mixing tank and Kasugamycin hydrochloride hydrate was added thereto with stirring till the Kasugamycin hydrochloride hydrate was completely dissolved. Laminarin was added to the solution above along with an amount of water to make up the volume to 1000 litres. pH of the formulation was adjusted to about 3.5. The formulation was then filtered and filled in bottles.

Efficacy Studies

Example 2: Foliar Application of Kasugamycin and Plant Resistance Elicitor in *Agave tequilana* (var. *Azul*) for Controlling *Pectobacterium carotovorum*

*Agave tequilana* (var. *Azul*) were foliar sprayed with formulations having Kasugamycin alone, plant resistance elicitor (laminarin) alone and Kasugamycin and laminarin.

Formulation 1 (Kasugamycin alone) was applied at a dosage of 1.5 l/ha.

Formulation 2 (laminarin alone) was applied at a dosage of 1.75 l/ha.

Formulation 3 (Kasugamycin and laminarin) was applied at a dosage of 1.5 l/ha of Kasugamycin and 1.75 l/ha of laminarin.

Two applications were made every 7 days when the first symptoms of the disease appeared, and the % control of *Pectobacterium carotovorum* was determined. FIG. 1 provides a graph showing comparative activities of Kasugamycin alone, laminarin alone and combination of Kasugamycin and laminarin (indicated as "K+L" in the graph). As can be seen from FIG. 1, combination of Kasugamycin and laminarin afforded highest activity (% control over *Pectobacterium carotovorum*).

Example 3: Foliar Application of Kasugamycin and Plant Resistance Elicitor in Onion (Var. Carta Blanca) for Controlling *Burkholderia gladioli*

Onion (var. Carta blanca) were foliar sprayed with formulations having Kasugamycin alone, plant resistance elicitor (laminarin) alone and Kasugamycin and laminarin.

Formulation 1 (Kasugamycin alone) was applied at a dosage of 1.5 l/ha.

Formulation 2 (laminarin alone) was applied at a dosage of 1.75 l/ha.

Formulation 3 (Kasugamycin and laminarin) was applied at a dosage of 1.5 l/ha of Kasugamycin and 1.75 l/ha of laminarin.

Figure 2:
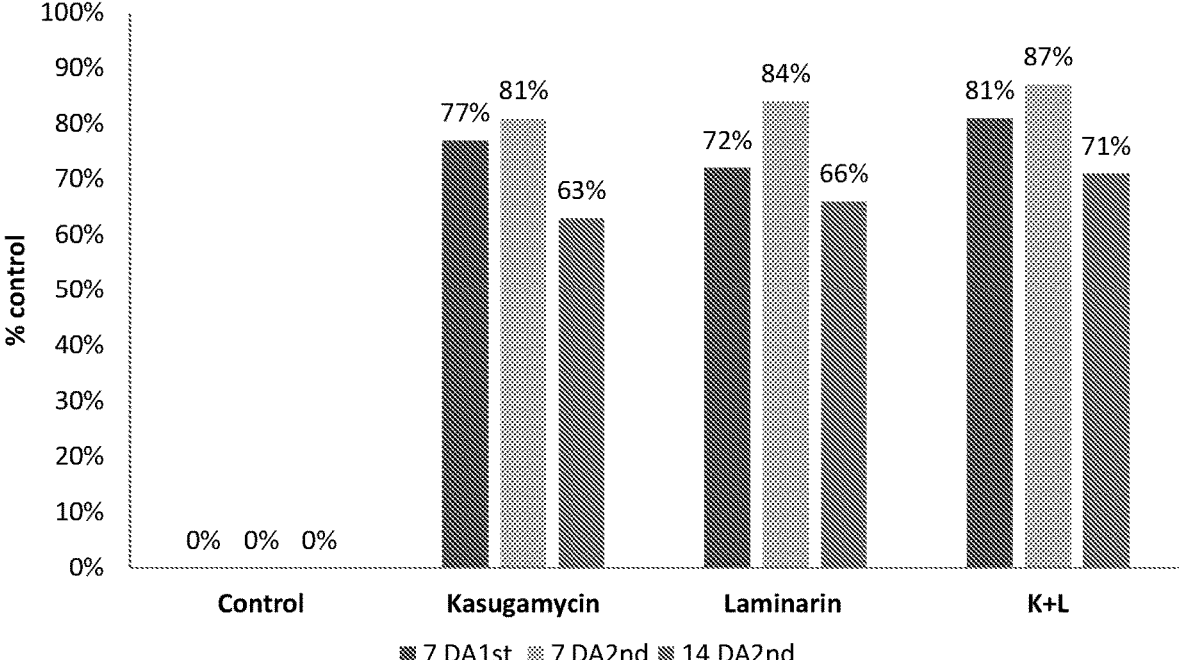
FIG. 2 depicts the percentage control of *Burkholderia gladioli* pv. *alliicola* using the present composition.

Two applications were made every 7 days when the first symptom of the disease appeared, and the percentage control of *Burkholderia gladioli* pv. *alliicola* was determined. The first evaluation was carried out seven days after the first application (indicated as 7DA1st in graph shown in FIG. 2), and two more evaluations were made at 7 days and 14 days after the second application (indicated as 7DA2nd and 14DA2nd respectively in graph shown in FIG. 2). FIG. 2 illustrates percentage control of *Burkholderia gladioli* pv. *alliicola*. As can be seen from FIG. 2, the composition having Kasugamycin and laminarin afforded highest % control over *Burkholderia gladioli* pv. *alliicola* as compared to Control (no treatment), Kasugamycin alone, and laminarin alone.

Example 4: In Vitro Control of *Fusarium oxysporum* Using the Combination of Kasugamycin and Laminarin A strain of *Fusarium oxysporum* isolated from potato was cultivated in a solid potato dextrose agar (PDA) medium. The efficacy of the mixture of kasugamycin and laminarin in a 1:1 ratio, and each component individually was tested.

TABLE 2

| Treatments | | |
| --- | --- | --- |
| Treatment | Product | Dose L/ 400 L water |
| T0 | Untreated Control | — |
| T1 | Kasugamycin | 1 |
| T2 | Laminarin | 1 |
| T3 | Kasugamycin + laminarin | 1 |

The in vitro assessment of the products effectiveness was carried out as per the treatments discussed in Table 2. Accordingly, the components in each treatment were dissolved in the PDA culture medium at the dose indicated above. The mixture was homogenized and poured into sterile petri dishes. Explants of 5 mm diameter of the fungus strain *Fusarium oxysporum* were placed on the petri dishes with PDA. The dishes were incubated inverted, in dark conditions at a temperature of 28-30° C. The evaluation of the inhibition of the fungus was carried out 7 days later.

A frequently used method for improving the use profile of an agrochemical is the combination of an active compound with one or more other active compounds which contribute to the desired additional properties. However, when two or more active compounds are applied in combination, it is not uncommon for phenomena of physical and biological incompatibility to occur, for example insufficient stability of a joint formulation, decomposition of an active compound or antagonism of the active compounds. What is desired are, in contrast, active compound combinations having a favorable activity profile, high stability and, if possible, synergistically enhanced activity, thus permitting the application rate to be reduced, compared with the individual application of the active compounds to be combined.

Chemical mixtures can have an antagonistic effect when mixed, where the results are less than expected when the chemicals are combined. There can also be an additive effect, where the resultant mixture gives results expected from the sum of its components. Finally, there can be a synergistic effect where the results are greater than expected. A synergistic result is rare and typically only observed in results from high concentrations. In the heavily regulated agrochemical industry, high concentrations are not desirable in the environment. Therefore, when a synergistic effect is achieved at low doses, the resultant mixture is indeed a rare and unexpected finding.

A synergistic effect of an agrochemical is always present when the anti-phytopathogenic activity of the active compound combinations exceeds the total of the activities of the active compounds when applied individually. The expected activity for a given combination of two active compounds can be calculated according to S. R. Colby ("Calculating Synergistic and Antagonistic Responses of Herbicide Combinations", Weeds 15, (1967), 20-22).

This effectiveness of all treatments as measured by percent reduction in the *Fusarium oxysporum* growth, was also evaluated according to Colby's equation as below.

If,

X is the percent inhibition of growth by kasugamycin (A) at an application rate, Y is the percent inhibition of growth by a plant resistance elicitor, i.e. laminarin (B) at an application rate, and E is the expected growth as a percent of control with kasugamycin and the plant resistance elicitor when applying the active compounds, A and B at application rates Then, $$E = X + Y - XY/100 \qquad \text{Colby's equation}$$

If the actual/observed anti-phytopathogenic efficacy of the kasugamycin and laminarin combination against *Fusarium oxysporum* exceeds the calculated value, then the activity of the combination is super additive, i.e. a synergistic effect exists. In this case, the efficacy which was actually observed must be greater than the value for the expected efficacy (E) calculated from the abovementioned formula.

Control percentage of *Fusarium oxysporum* with the kasugamycin laminarin mixture, as well as that of kasugamycin and laminarin separately are provided in Table 3 below:

TABLE 3

Control percentage of *Fusarium oxysporum*

| No. | Treatment | % Observed control | % Expected control | Difference between observed and actual efficacy in percentage | Conclusion |
|---|---|---|---|---|---|
| T0 | Untreated Control | 0 | — | — | — |
| T1 | Kasugamycin | 48 | — | — | |
| T2 | Laminarin | 11 | — | — | |
| T3 | Kasugamycin + Laminarin | 59 | 53.72 | 5.82 | Synergistic |

Figure 3:
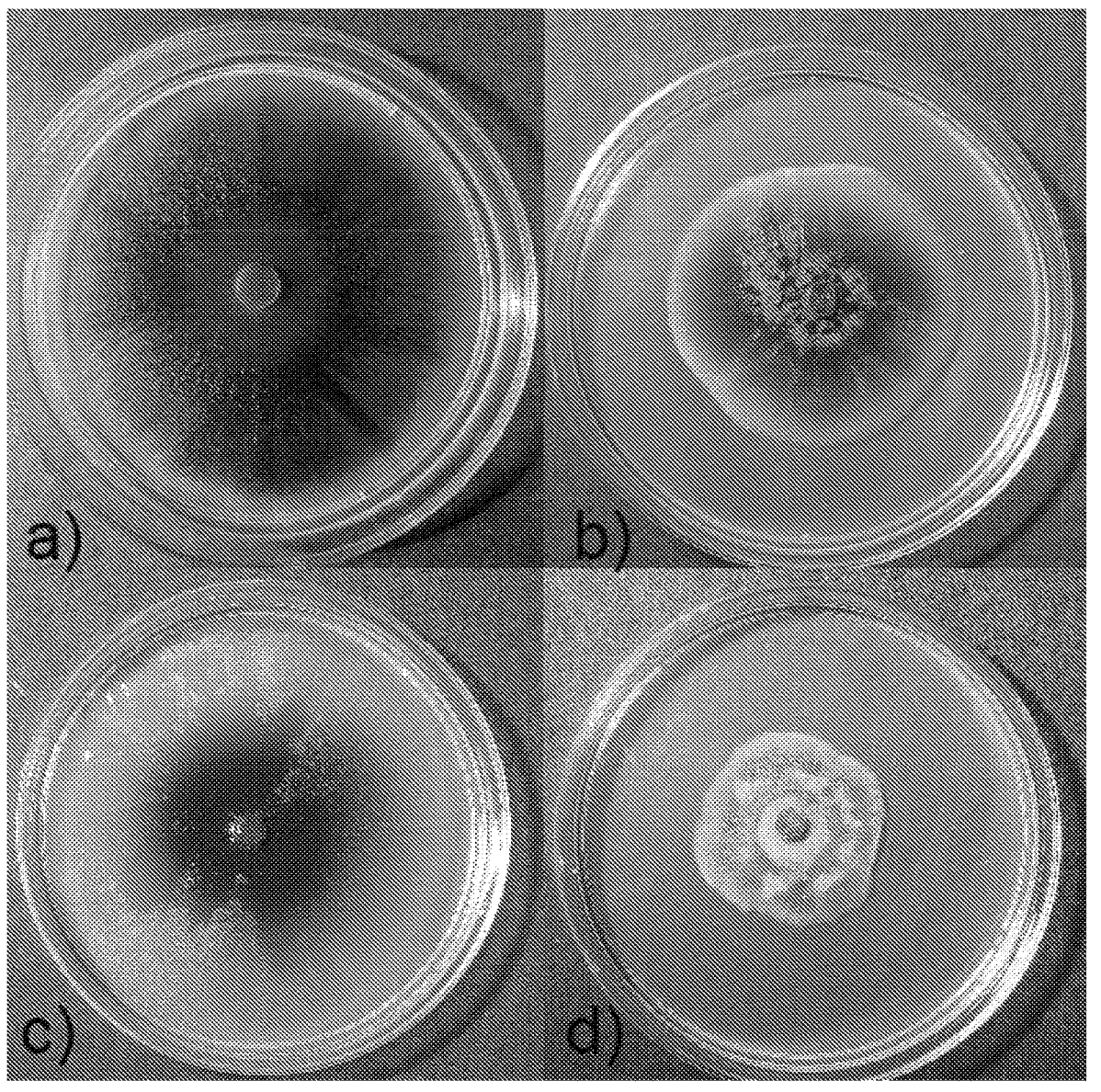
FIG. 3 depicts the growth inhibition of *Fusarium oxysporum* with a) untreated control, b) kasugamycin c) laminarin and d) kasugamycin and laminarin mixture.

Based on the observations from table 3, the present kasugamycin and laminarin combination is synergistic in a ratio of 1:1 and showed exemplary control of the fungi. The corresponding FIG. 3 also showed almost complete control of *Fusarium oxysporum* using the kasugamycin and laminarin treatment as per table 2.

Example 5: In Vitro Control of *Alternaria alternata* Using the Combination of Kasugamycin and Laminarin A strain of *Alternaria alternata* isolated from potato was cultivated in a solid potato dextrose agar (PDA) medium. The efficacy of the mixture of kasugamycin and laminarin in a 1:1 ratio, and each component individually was tested.

TABLE 4

Treatments

| Treatment | Product | Dose L/ 400 L water |
|---|---|---|
| T0 | Untreated Control | — |
| T1 | Kasugamycin | 1 |
| T2 | Laminarin | 1 |
| T3 | Kasugamycin + laminarin | 1 |

The in vitro assessment of the products effectiveness was carried out as per the treatments discussed in Table 4. Accordingly, the components in each treatment were dissolved in PDA culture medium at the dose indicated above. The mixture was homogenized and poured into sterile petri dishes. Explants of 5 mm diameter of *Alternaria alternata* were placed on the petri dishes with PDA. The dishes were incubated inverted in dark conditions at a temperature of 28-30° C. The evaluation of the inhibition of the fungus was carried out 7 days later.

The present inventors have calculated the Colby value of the synergistic combination as discussed in Example 4 above.

Control percentage of *Alternaria alternata* with the kasugamycin laminarin mixture, as well as of kasugamycin and laminarin separately are provided in Table 5 below:

TABLE 5

Control percentage of *Alternaria alternata*

| No. | Treatment | % Observed control | % Expected control | Difference between observed and actual efficacy in percentage | Conclusion |
|---|---|---|---|---|---|
| T0 | Untreated Control | 0 | — | — | — |
| T1 | Kasugamycin | 54 | — | — | |
| T2 | Laminarin | 30 | — | | |
| T3 | Kasugamycin + Laminarin | 71 | 67.8 | 3.2 | Synergistic |

Figure 4:
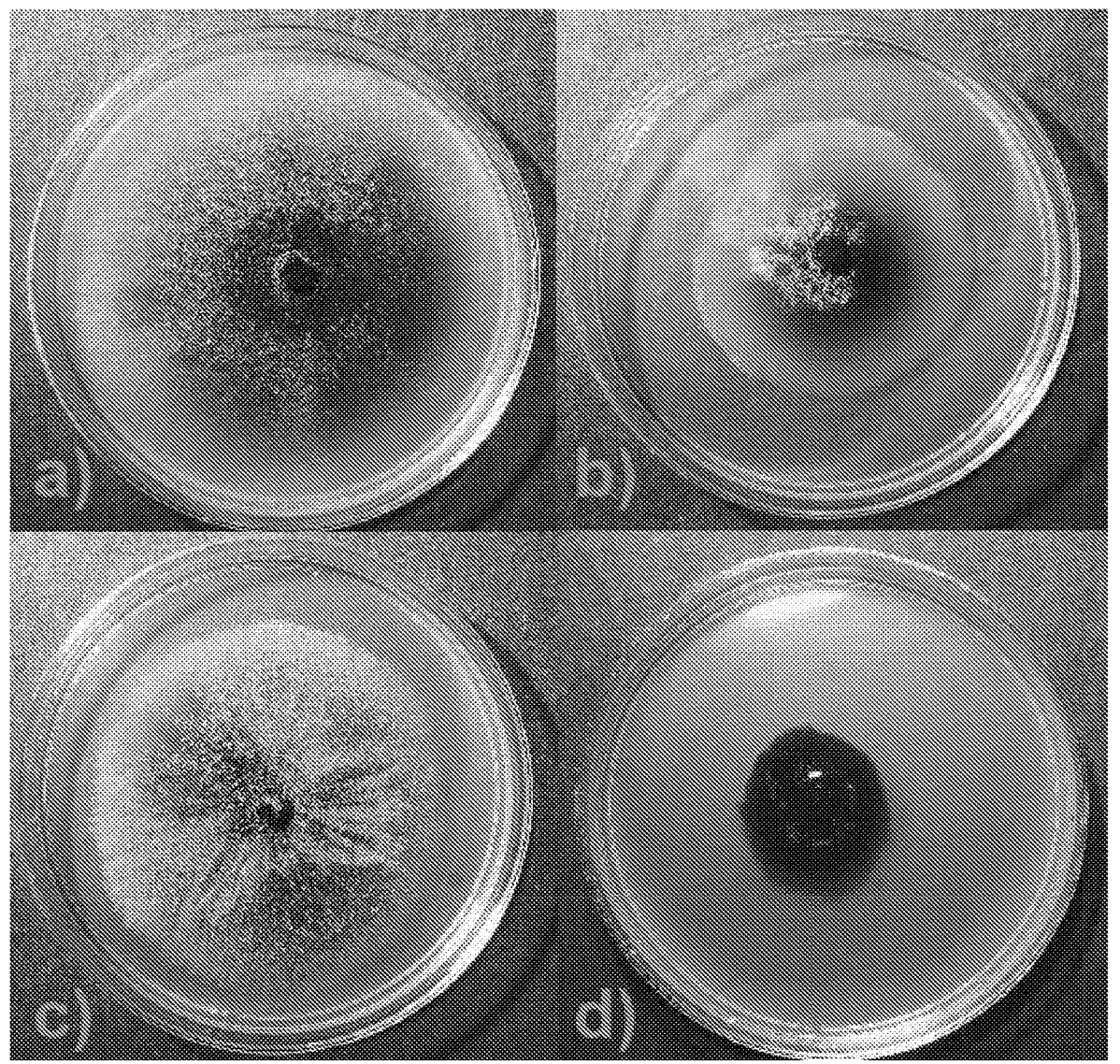
FIG. 4 depicts the growth inhibition of *Alternaria alternata* with a) untreated control, b) kasugamycin c) laminarin and d) kasugamycin and laminarin mixture.

Based on the observations from table 5, the present kasugamycin and laminarin combination is synergistic in a ratio of 1:1 and showed exemplary control of the fungi. The corresponding FIG. 4 also showed almost complete control of *Fusarium oxysporum* using the kasugamycin and laminarin treatment as per table 4.

Based on the aforesaid studies, it could be concluded that the compositions including Kasugamycin or salt thereof and laminarin (plant resistance elicitor) exhibit wide spectrum of antibacterial and antifungal activities precluding development of resistance in phytopathogens and is synergistic. Further, it could be observed that the compositions aids in reducing phytotoxicity.

ADVANTAGES

The present disclosure provides a new and improved agricultural composition that may overcome the limitations associated with the conventional agricultural compositions.

The present disclosure provides an agricultural composition that exhibits broad spectrum antifungal and antibacterial properties.

The present disclosure provides an agricultural composition that exhibits desired antifungal and antibacterial effect at lower dosage.

The present disclosure provides an agricultural composition that aid in precluding development of resistance of phytopathogens towards Kasugamycin or salt thereof.

The present disclosure provides an agricultural composition that is safe to use.

The present disclosure provides an agricultural composition that is cost-effective.

The present disclosure provides an agricultural composition that is easy to prepare.

We claim:

1. An agricultural combination comprising kasugamycin or a salt thereof and a plant resistance elicitor; wherein the weight ratio of kasugamycin or the salt thereof to the plant resistance elicitor is from 1:1 to 1:30.

2. The combination as claimed in claim 1, wherein the plant resistance elicitor is laminarin.

3. An agricultural composition comprising the combination of claim 1 and an agriculturally acceptable excipient.

4. The composition as claimed in claim 3, wherein the kasugamycin salt is kasugamycin hydrochloride hydrate and the plant resistance elicitor is laminarin.

5. The composition as claimed in claim 3, wherein the composition is a liquid composition.

6. The composition as claimed in claim 3, wherein the composition further comprises an herbicide, a fungicide, an insecticide, or an acaricide.

7. The composition as claimed in claim 3, wherein said composition comprises the kasugamycin or the salt thereof in an amount from about 1% w/v to about 40% w/v of the composition.

8. The composition as claimed in claim 3, wherein said composition comprises the plant resistance elicitor in an amount from about 10% w/v to about 40% w/v of the composition.

9. A liquid agricultural composition comprising
   (i) kasugamycin or a salt thereof,
   (ii) a plant resistance elicitor, and
   (iii) an agriculturally acceptable excipient,
   wherein the weight ratio of the kasugamycin or the salt thereof to the plant resistance elicitor is from 1:1 to 1:30.

10. The composition as claimed in claim 9, wherein said composition is an aqueous composition.

11. The composition as claimed in claim 9, wherein the kasugamycin salt is kasugamycin hydrochloride hydrate and the plant resistance elicitor is laminarin.

12. A method of controlling phytopathogens comprising applying at the locus of an infection by the phytopathogen, to a plant, to a plant part, or to a plant propagation material a composition comprising kasugamycin or a salt thereof and laminarin, wherein the weight ratio of kasugamycin or the salt thereof and laminarin is from 1:1 to 1:30.

13. The method as claimed in claim 12, wherein the kasugamycin or the salt thereof is applied at a dosage from 1 to 5 l/ha of kasugamycin and the plant resistance elicitor is applied at a dosage from 1 to 10 l/ha of the plant resistance elicitor.

* * * * *